Figure 1:
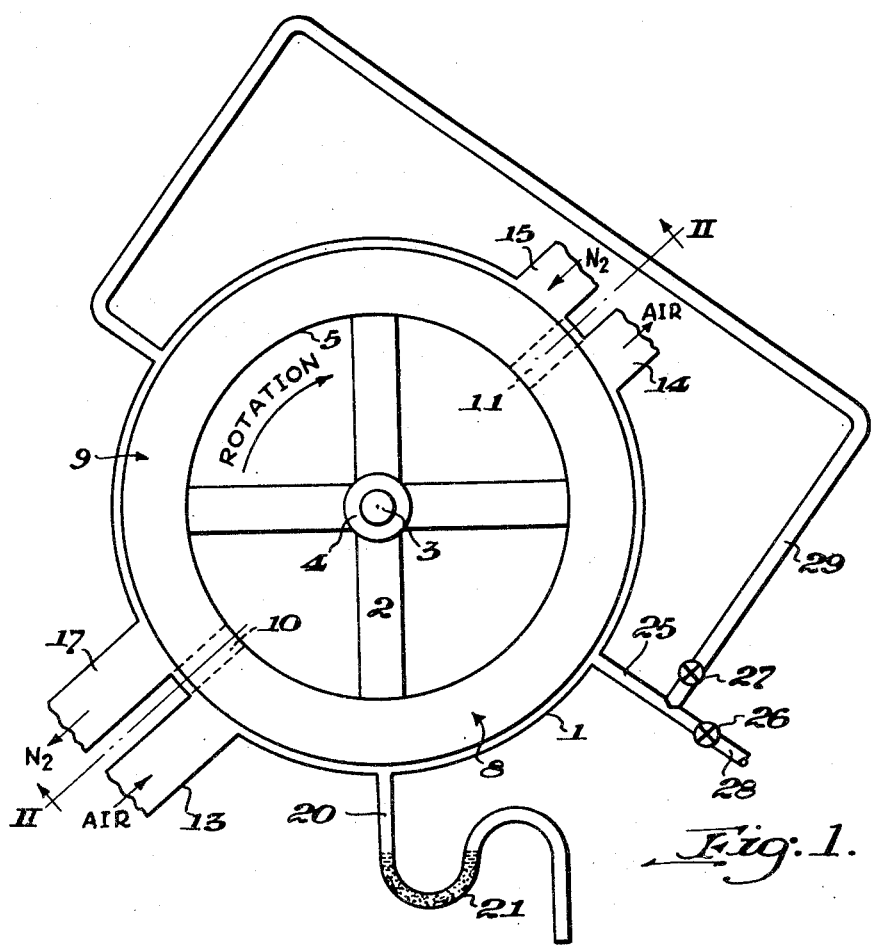

Dec. 26, 1950 D. B. CRAWFORD 2,535,351
GAS PURIFYING APPARATUS
Filed Sept. 10, 1948

INVENTOR.
DUFFER B. CRAWFORD.
BY
Brown, Critchlow, Flick & Peckham
his ATTORNEYS.

Patented Dec. 26, 1950

2,535,351

UNITED STATES PATENT OFFICE 2,535,351

GAS PURIFYING APPARATUS

Duffer B. Crawford, Jeannette, Pa., assignor to Elliott Company, Jeannette, Pa., a corporation of Pennsylvania Application September 10, 1948, Serial No. 48,725

5 Claims. (Cl. 62—122)

This invention relates to purifying a gaseous mixture by cooling it to very low temperatures in a rotary regenerative heat exchanger.

Regenerative heat exchangers of the rotary type have been developed to the point where they are well adapted to cool a gaseous mixture to very low temperatures, but not to purify it. One of the more efficient and economical of these exchangers, from the standpoint of cooling alone, has an annular passage partitioned into two arcuate conduits, one for the gaseous mixture that is to be cooled and the second for the countercurrent flow of a cold gas. Regenerative heat transfer material carried by a rotor mounted between the conduits travels successively through both conduits in a direction opposite to the flow of gaseous fluid therein. The regenerative material has flow passages therethrough, the passages that are in one conduit at a given time being sealed by appropriate means from those in the other conduit. As the regenerative material travels through the second conduit against the stream of cold gas flowing therein, successive portions of the material are progressively cooled to increasingly lower temperatures by giving up heat to the cold gas. Thereafter, successive portions of the material when they have reached their lowest temperature, pass through the sealing means and enter the first conduit and are there progressively warmed by absorbing heat from the gaseous mixture that is to be cooled. Continuous heat exchange is thereby effected between the two separated gaseous fluids.

While heat exchangers of the type just described are capable of cooling a gaseous mixture to very low temperatures with efficiency and economy, they are not extensively used for that purpose because low volatile impurities generally present in the gaseous mixture are condensed in the cold regions of the first conduit and prevent continuous operation of the apparatus. For example, when such an exchanger is used to cool air down to or just above its liquefaction temperature, the water vapor present in the air is condensed as a frost on the cold surfaces of the regenerative material in that region of the air conduit where the temperature decreases from 32° F. to about −110° F. As the incoming air flows further along the conduit through progressively colder zones, carbon dioxide will be similarly deposited as a snow, as will other low volatile impurities that may be present in the air. Since the regenerative material is continually travelling through the conduit against the stream of entering air, these deposited impurities are continually being carried towards the warm end of the air conduit where they melt or evaporate. They are not, however, discharged from the apparatus but are immediately borne by the incoming air back to colder regions of the conduit, where they are again condensed upon colder surfaces of the regenerative material. As a result, impurities once condensed and deposited in the exchanger remain there; and, as air continues to flow through the exchanger, additional deposits are built up until eventually the air passages through the regenerative material become so clogged that the apparatus must be shut down for defrosting. Such interruptions in the otherwise continuous operation of the heat exchanger are costly and inconvenient.

It is accordingly among the objects of this invention to provide apparatus for continuously purifying a gaseous mixture by cooling it to very low temperatures, in which low volatile impurities condensed from the mixture will be continuously removed from the apparatus so as not to interrupt its continuous operation.

In accordance with this invention, the purifier apparatus comprises a rotary regenerative heat exchanger of the type previously described, having a conduit for a gaseous mixture that is to be cooled and having cold regenerative heat transfer material travelling through the conduit in a direction opposite to the flow of gaseous mixture. The conduit is provided, between its warm and cold ends, with one or more discharge pipes, each connected to the conduit at a place where the temperature of the adjacent regenerative material corresponds to, or is slightly above, the fluidifying temperature (i. e., the melting or the sublimation temperature) of a given low volatile impurity previously deposited on that material in colder regions of the conduit and then carried by it toward the warm end of the conduit. Adjacent to each discharge pipe a given impurity will therefore be present in either a solid, liquid, or gaseous state (in some cases, in all three states) and will include not only the amount of that impurity normally contained in the gaseous mixture but also the additional amount melted or sublimed from the regenerative surfaces. If the given impurity is locally concentrated largely in a liquid state, the liquid portion may be discharged through one of said pipes without withdrawing any of the gaseous mixture from the conduit. If, on the other hand, the given impurity is locally concentrated largely in a gaseous state, it cannot be withdrawn by itself; but its local concentration will be so much higher than its normal concentration in the gaseous mixture that by bleeding only a small portion of this impurity-enriched mixture through the adjacent discharge pipe, it is possible to remove from the apparatus as much of the given impurity as is being brought into it from outside by the incoming gaseous mixture. This removal is continuous. Under certain circumstances, it is practicable to conserve the refrigeration contained in the partly cooled gaseous mixture withdrawn through the discharge pipe. If, for example, the cooling gas flowing in the second conduit does not have to leave it in a pure state, then the impurity-enriched gaseous mixture withdrawn from the first conduit may be led into the second conduit at a point where the temperature of the enriched mixture corresponds to that of the cooling gas. Since the resultant mixed gases always move towards the warm end of the second conduit before being discharged from the apparatus, there is no chance for the impurities to again condense.

Figure 2:
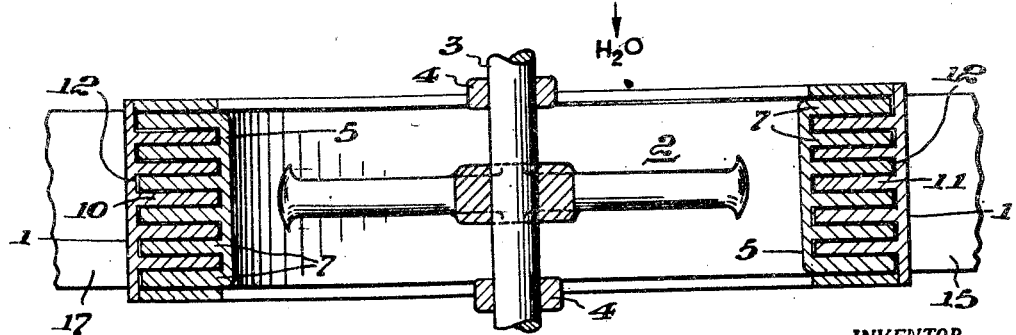

The preferred embodiment of this invention is shown somewhat diagrammatically in the accompanying drawings, in which Fig. 1 represents a sectional elevation of a simple form of a rotary heat exchanger, which is given by way of example, and Fig. 2 a section taken on the line II—II of Fig. 1.

The purifier includes a cylindrical casing 1; within it is mounted a rotor 2 on a shaft 3, which is supported by bearings 4 in the side walls of the casing. The rotor has a cylindrical flange 5 spaced from the cylindrical wall of the casing and concentric with it, forming an annular passage within the casing. Disposed within this passage is regenerative heat transfer material, shown in the drawings in one of its simplest forms as a plurality of spaced annular disks 7 attached by their inner edges to the flange 5 so as to rotate with it in the casing. The annular passage between the flange of the rotor and the cylindrical wall of the casing is divided into two separate arcuate conduits 8 and 9 by radial partitions 10 and 11 attached to the cylindrical wall of the casing at diametrically opposite points. The partitions are each provided with slots 12 that receive the metal disks 7. On either side of each partition in the curved wall of the casing there is an entrance port and a discharge port communicating with the ends of conduits 8 and 9 within the casing.

For purposes of illustration only, it will be assumed that the purifier shown in the drawings is being used as part of an air separation plant to cool and purify the incoming air before it is rectified into oxygen and nitrogen. It will also be assumed that the air has been partially dehumidified, in accordance with the common practice in such plants, and has a dew point below 32° F. This air at substantially atmospheric pressure enters the purifier apparatus through entrance port 13 and after flowing through conduit 8 leaves the apparatus through discharge port 14. Cold nitrogen, at a slightly lower pressure than the air, flows through the purifier in conduit 9 in a direction counter-current to the flow of air, entering the conduit by port 15 and leaving it by port 17. Because of the partitions 10 and 11 between the adjacent ends of the two conduits, these gaseous fluids are not commingled.

As the gases flow through the apparatus in the directions indicated, the rotor 2 supporting the regenerative disks 7 is continuously rotated in a direction opposite to the flow of gaseous fluid in each conduit. The temperature of the nitrogen entering port 15 may be about —318° F., and it will cool the immediately adjacent regenerative surfaces to about —310° F. As this cold gas flows further through conduit 9, it continues to absorb heat from the regenerative material until it is finally discharged through port 17 at about the ambient temperature. The regenerative material cooled in conduit 9 passes through a partition 11 and enters conduit 8, where it is progressively warmed by absorbing heat from the air flowing through that conduit. When the regenerative material has reached the air entrance port 13, it will have been warmed to approximately the temperature of the incoming air before it passes through partition 10 into the warm end of conduit 9 where it will again be cooled by cold nitrogen.

The air flowing through conduit 8 and giving up its heat to the regenerative material travelling through it will deposit its contained low volatile impurities on the regenerative surfaces in certain temperature zones. For example, water vapor will be condensed as a frost on those surfaces where the temperature ranges from about 32° F. to —110° F., below which temperature there is substantially no water vapor left in the air. In a temperature zone beginning at around —220° F., carbon dioxide will be deposited on the regenerative surfaces as a snow. Acetylene will likewise be deposited where the temperature is below —300° F. The condensation and deposition of these impurities purifies the air, which leaves conduit 8 by discharge port 14 at a temperature of about —310° F.

Ordinarily, the impurities deposited on the regenerative surfaces in different temperature zones of conduit 8 would accumulate in those zones in the manner previously explained in spite of the continuous movement of the regenerative material through the conduit, and the air passages through the regenerative material would become so clogged as to require defrosting of the apparatus. This invention avoids such an accumulation of impurities by providing one or more discharge openings in conduit 8 adjacent to the region or regions therein where the temperature of the regenerative material corresponds to, or is slightly above, the temperature at which a given impurity is fluidified, i. e., melted or sublimed by changing from a solid to either a liquid or gaseous state. For example, a discharge pipe 20 may be connected to casing 1 at a point where the temperature of the regenerative material moving past the inlet of this pipe is around 32° F., the temperature at which any ice on those surfaces will melt. The entering air is, of course, at a slightly higher temperature in this same region which aids the melting process. Since substantially all of the water vapor that is deposited on the regenerative surfaces in the form of ice or frost will be brought by the rotation of the rotor back to warmer regions in conduit 8 adjacent to discharge pipe 20 and will there be melted, the resulting liquid can be withdrawn from the apparatus without interrupting its continuous operation. Discharge pipe 20 is preferably provided with a trap 21 to prevent the escape of air from the conduit.

Similarly, a second discharge pipe 25 may be located in the casing at a point where the temperature of the adjacent regenerative material in conduit 8 corresponds to, or is slightly above, the sublimation point of carbon dioxide. Because solidified carbon dioxide on being warmed passes directly from a solid to a gaseous state, it becomes commingled with the air and, unlike a liquid, cannot be withdrawn from the apparatus by itself. However, its local concentration in the air adjacent to discharge pipe 25 will be so much higher than its normal concentration that by withdrawing only a small portion of this carbon-dioxide-enriched air from the conduit it is possible to remove carbon dioxide from the system as rapidly as it is brought in. In this way, all congestion of the apparatus due to the excess accumulation of carbon dioxide deposits is avoided.

The carbon-dioxide-enriched air withdrawn from conduit 8 through discharge pipe 25 may, by the proper operation of valves 26 and 27, be discharged into the atmosphere through pipe 28 or be conducted by pipe 29 to conduit 9 at a point where the temperature of the cold nitrogen in that conduit is the same as that of the enriched air. In the latter case, the refrigeration contained in the partly cooled air withdrawn from conduit 8 is conserved within the system; but the nitrogen, of course, will be contaminated with carbon dioxide. However, such contamination is frequently unimportant; and, since this mixture of nitrogen and impure air will flow towards the warm end of conduit 9 where it is discharged from the apparatus, there is no danger that the carbon dioxide will be again condensed in the purifier.

Valves 26 and 27, or their equivalents in other discharge pipes not shown, may also be used to regulate the quantity of impurity-enriched gas withdrawn from conduit 8, so as to maintain a balance between the amount of a given impurity, in this case carbon dioxide, entering the apparatus and the amount withdrawn therefrom under various operating conditions.

Similar discharge pipes may be provided at other suitable places in the casing 1 adjacent to conduit 8 for the removal of such other impurities, if any, as acetylene, that may be present in the entering air in sufficient quantity to cause eventual interruption in the otherwise continuous operation of the apparatus.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

As used in the appended claims, the term "fluidifying temperature" refers to the temperature at which a low volatile impurity in the solid state changes to a fluid, while "fluidified" includes both melted, i. e., changed from a solid to a liquid, and sublimed, i. e., changed from a solid to a gas.

I claim:

1. In a rotary type heat exchanger having a conduit for a gaseous mixture that is to be cooled and purified by giving up heat to cold regenerative heat transfer material travelling through the conduit in a direction opposite to the flow of gaseous mixture so as to cool the mixture and condense low volatile impurities therein as a solid on the surface of the regenerative material, apparatus comprising a discharge pipe connected to the conduit at a place where the temperature of the adjacent regenerative material is at about the fluidifying temperature of a given low volatile impurity previously condensed thereon as a solid in colder regions of the conduit, whereby said condensed impurity having been carried by the regenerative material to warmer regions of the conduit adjacent to said pipe will be fluidified and at least some of the impurity in the fluid state will be discharged through said pipe.

2. In a rotary type heat exchanger having a conduit for a gaseous mixture that is to be cooled and purified by giving up heat to cold regenerative heat transfer material travelling through the conduit in a direction opposite to the flow of gaseous mixture so as to cool the mixture and condense low volatile impurities therein as a solid on the surface of the regenerative material, apparatus comprising a discharge pipe connected to the conduit at a place where the temperature of the adjacent regenerative material is at about the sublimation temperature of a given low volatile impurity previously condensed thereon as a solid in colder regions of the conduit, whereby said condensed impurity having been carried by the regenerative material to warmer regions of the conduit adjacent to said pipe will be sublimed and some of the gaseous mixture containing a higher than normal concentration of said impurity in the gaseous state will be discharged through said pipe.

3. In a rotary type heat exchanger having a conduit for a gaseous mixture that is to be cooled and purified by giving up heat to cold regenerative heat transfer material travelling through the conduit in a direction opposite to the flow of gaseous mixture so as to cool the mixture and condense the water vapor contained therein to ice, apparatus comprising a discharge pipe connected to the conduit at a place where the temperature of the adjacent regenerative material is at about the melting temperature of ice previously condensed thereon in colder regions of the conduit, whereby said ice having been carried by the regenerative material to warmer regions of the conduit adjacent to said pipe will be melted and the resulting liquid will be discharged through said pipe, and a trap in said discharge pipe to prevent the gaseous mixture in the conduit from being discharged through said pipe.

4. In a rotary type heat exchanger having an annular passage partitioned into two arcuate conduits, one for a gaseous mixture that is to be cooled and purified and the second for the countercurrent flow of a cold gas, and having regenerative heat transfer material carried by a rotor mounted between the conduits so that the regenerative material travels through both conduits in a direction opposite to the flow of gaseous fluid therein to cool the mixture and condense low volatile impurities in the mixture as a solid on the surface of the regenerative material, apparatus comprising a discharge pipe with its inlet connected to the first conduit at a place where the temperature of the adjacent regenerative material is at about the sublimation temperature of a given low volatile impurity previously condensed thereon as a solid in colder regions of the first conduit, whereby said impurity having been carried by the regenerative material to warmer regions of the first conduit adjacent to said pipe will be sublimed and some of the gaseous mixture adjacent to the inlet of said pipe and containing a higher than normal concentration of said impurity in the gaseous state will be discharged through said pipe, and the outlet of said pipe connected to the second conduit at a place where the temperature of the cold gas therein is at about the same temperature as the impurity enriched mixture in said pipe.

5. In a rotary heat exchanger of the type described, having an annular passage partitioned into two separate arcuate conduits, each conduit having a warm end and a cold end, apparatus comprising an inlet port at the warm end of the first conduit for continuously admitting a gaseous mixture that is to be cooled and purified; an outlet port at the cold end of the first conduit for withdrawing the cooled purified mixture therefrom; an inlet port at the cold end of the second conduit for continuously admitting a cold purified gas; an outlet port at the warm end of the second conduit for withdrawing the warmed gas therefrom; regenerative heat transfer material in said conduits that is adapted to move continuously in relation thereto through each conduit and from one conduit to the other in a direction opposed to the flow of the gaseous fluids therein, whereby the regenerative material in moving from the warm end to the cold end of the second conduit will be progressively cooled by the cold gas flowing through that conduit and then in moving from the cold end to the warm end of the first conduit will be progressively warmed by the gaseous mixture flowing through the first conduit so that low volatile impurities contained in the mixture in the first conduit will be deposited as a solid on the cold surfaces of the regenerative material therein and will then be carried to warmer regions in that conduit where those impurities will be fluidified; and an impurity discharge pipe connected to the first conduit at a place intermediate of its ends where the temperature of the adjacent regenerative material is at about the fluidifying temperature of one of the low volatile impurities previously condensed thereon in colder regions of the first conduit, whereby said impurity will be sublimed and some of the gaseous mixture adjacent to the inlet of said pipe containing a higher than normal concentration of said impurity in the gaseous state will be discharged through said pipe to prevent the accumulation of said impurity in the first conduit.

DUFFER B. CRAWFORD.

REFERENCES CITED

The following references are of record in the file of this patent:

UNITED STATES PATENTS

| Number | Name | Date |
|---|---|---|
| 772,387 | Titus | Oct. 18, 1904 |
| 1,601,355 | Esbran | Sept. 28, 1926 |
| 1,697,591 | Dowd | Jan. 1, 1929 |
| 2,364,279 | Dodge | Dec. 5, 1944 |
| 2,469,758 | Alcock | May 10, 1949 |